US009754584B2

(12) United States Patent
Parada San Martin et al.

(10) Patent No.: US 9,754,584 B2
(45) Date of Patent: *Sep. 5, 2017

(54) USER SPECIFIED KEYWORD SPOTTING USING NEURAL NETWORK FEATURE EXTRACTOR

(71) Applicant: Google Inc., Mountain View, CA (US)

(72) Inventors: Maria Carolina Parada San Martin, Palo Alto, CA (US); Tara N. Sainath, Jersey City, NJ (US); Guoguo Chen, Baltimore, MD (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,982

(22) Filed: Nov. 8, 2016

(65) Prior Publication Data
US 2017/0076717 A1   Mar. 16, 2017

Related U.S. Application Data

(63) Continuation of application No. 14/579,603, filed on Dec. 22, 2014, now Pat. No. 9,508,340.

(51) Int. Cl.
*G01L 15/00* (2006.01)
*G10L 15/16* (2006.01)
(Continued)

(52) U.S. Cl.
CPC ............ *G10L 15/16* (2013.01); *G06F 1/3203* (2013.01); *G06N 3/02* (2013.01); *G10L 15/02* (2013.01);
(Continued)

(58) Field of Classification Search
CPC ....... G06F 1/3203; G10L 15/02; G10L 15/16; G10L 15/28; G10L 2015/0631; G10L 2015/088
(Continued)

(56) References Cited

U.S. PATENT DOCUMENTS 9,473,643 B2 * 10/2016 Baran ................... H04M 3/568
9,589,564 B2 *  3/2017 Sharifi ..................... G10L 15/26
(Continued)

OTHER PUBLICATIONS

U.S. Appl. No. 13/861,020, Nguyen et al., filed Apr. 11, 2013.
(Continued)

*Primary Examiner* — Charlotte M Baker
(74) *Attorney, Agent, or Firm* — Fish & Richardson P.C.

(57) ABSTRACT

Methods, systems, and apparatus, including computer programs encoded on computer storage media, for recognizing keywords using a long short term memory neural network. One of the methods includes receiving, by a device for each of multiple variable length enrollment audio signals, a respective plurality of enrollment feature vectors that represent features of the respective variable length enrollment audio signal, processing each of the plurality of enrollment feature vectors using a long short term memory (LSTM) neural network to generate a respective enrollment LSTM output vector for each enrollment feature vector, and generating, for the respective variable length enrollment audio signal, a template fixed length representation for use in determining whether another audio signal encodes another spoken utterance of the enrollment phrase by combining at most a quantity k of the enrollment LSTM output vectors for the enrollment audio signal.

21 Claims, 8 Drawing Sheets

(51) Int. Cl.
G10L 15/02 (2006.01)
G06F 1/32 (2006.01)
G06N 3/02 (2006.01)
G10L 25/51 (2013.01)
G10L 15/08 (2006.01)
G10L 15/06 (2013.01)
G10L 15/28 (2013.01)

(52) U.S. Cl.
CPC .............. *G10L 25/51* (2013.01); *G10L 15/28* (2013.01); *G10L 2015/0631* (2013.01); *G10L 2015/088* (2013.01)

(58) Field of Classification Search
USPC .................................................. 704/232, 235
See application file for complete search history.

(56) References Cited

U.S. PATENT DOCUMENTS

2015/0221305 A1 8/2015 Sharifi
2016/0182727 A1 6/2016 Baran

OTHER PUBLICATIONS

U.S. Appl. No. 13/860,982, Vanhoucke et al., filed Apr. 11, 2013.
'Sensory, Inc.' [online]. "Embedded Speech Technologies for Consumer Electronics," publically available before Dec. 18, 2014 [retrieved Sep. 17, 2014]. Retrieved from the Internet: URL<http://www.sensoryinc.com/>, 2 pages.
'Wikipedia' [online]. "Dynamic time warping," Aug. 27, 2014 [retrieved on Oct. 21, 2014]. Retrieved from the Internet: URL<http://en.wikipedia.org/wiki/Dynamic_time_warping>, 5 pages.
'Wikipedia' [online]. "Long short term memory," Sep. 30, 2014 [retrieved on Oct. 21, 2014]. Retrieved from the Internet: URL<http://en.wikipedia.org/wiki/LSTM>, 4 pages.
Chen et al., "Quantifying the value of pronunciation lexicons for keyword search in low resource languages," 2013 IEEE International Conference on Acoustic, Speech and Signal Processing (ICASSP), May 2013, pp. 8560-8564.
Chen et al., "Small-footprint keyword spotting using deep neural networks," 2014 IEEE International Conference on Acoustic, Speech and Signal Processing (ICASSP), May 2014, pp. 4087-4091.
Chen et al., "Using proxies for OOV keywords in the keyword search task," 2013 IEEE Workshop on Automatic Speech Recognition and Understanding (ASRU), Dec. 2013, pp. 416-421.
Graves et al., "Speech Recognition With Deep Recurrent Neural Networks," 2013 IEEE International Conference on Acoustics, Speech and Signal Processing (ICASSP), May 2013, pp. 6645-6649.
Hazen et al., "Query-By-Example Spoken Term Detection Using Phonetic Posteriorgram Templates," IEEE Workshop on Automatic Speech Recognition & Understanding, 2009, ASRU 2009, Nov.-Dec. 2009, pp. 421-426.
Hinton et al., "Deep Neural Networks for Acoustic Modeling in Speech Recognition," IEEE Signal Processing Magazine, Nov. 2012, pp. 82-97.
Hughes and Mierle, "Recurrent Neural Networks for Voice Activity Detection," 2013 IEEE International Conference on Acoustic, Speech and Signal Processing (ICASSP), May 2013, pp. 7378-7382.
Keshet et al., "Discriminative Keyword Spotting," Elsevier, Oct. 6, 2008, 27 pages.
Levin et al., "Fixed-Dimensional Acoustic Embeddings of Variable-Length Segments in Low-Resource Settings," 2013 IEEE Workshop on Automatic Speech Recognition and Understanding (ASRU), pp. 410-415, Dec. 2013.
Li and Wu. "Constructing Long Short-Term Memory based Deep Recurrent Neural Networks for Large Vocabulary Speech Recognition." arXiv preprint arXiv:1410.4281 (2014), Oct. 16, 2014, 6 pages.
Parada et al., "Query-by-Example Spoken Term Detection for OOV Terms," IEEE Workshop on Automatic Speech Recognition & Understanding, 2009, ASRU 2009, Nov.-Dec. 2009, pp. 404-409.
Sak et al., "Long Short-Term Memory Based Recurrent Neural Network Architectures for Large Vocabulary Speech Recognition," in Interspeech 2014, Feb. 5, 2014, 5 pages.
Taigman et al., "DeepFace: Closing the Gap to Human-Level Performance in Face Verification," 2014 IEEE Conference on Computer Vision and Pattern Recognition, pp. 1701-1708, Jun. 2014.
Wöllmer et al., "Long Short-Term Memory Networks for Noise Robust Speech Recognition," Interspeech 2010, Sep. 26-30, 2010, pp. 2966-2969.
Wöllmer et al., "Recognition of Spontaneous Conversational Speech using Long Short-Term Memory Phoneme Predictions," in Proc. of Interspeech, Makuhari, Sep. 26-30, 2010, pp. 1946-1949.
Zhang and Glass, "Unsupervised Spoken Keyword Spotting via Segmental DTW on Gaussian Posteriorgrams," Proceedings of the 2009 IEEE Workshop on Automatic Speech Recognition & Understanding (ASRU 2009) IEEE, Nov.-Dec. 2009, pp. 398-403.

\* cited by examiner

USER SPECIFIED KEYWORD SPOTTING USING NEURAL NETWORK FEATURE EXTRACTOR

CROSS REFERENCE TO RELATED APPLICATION

This application is a continuation of U.S. application Ser. No. 14/579,603, filed Dec. 22, 2014, the contents which are incorporated by reference.

BACKGROUND

Automatic speech recognition is one technology that is used in mobile devices. One task that is a common goal for this technology is to be able to use voice commands to wake up a mobile device or to have basic spoken interactions with the mobile device. For example, it may be desirable for the mobile device to recognize a "hotword" that signals that the mobile device should activate when the mobile device is in a sleep state.

SUMMARY

In general, one innovative aspect of the subject matter described in this specification can be embodied in methods that include the actions of receiving, by a device for each of multiple variable length enrollment audio signals each encoding a respective spoken utterance of an enrollment phrase, a respective plurality of enrollment feature vectors that represent features of the respective variable length enrollment audio signal, wherein when the device determines that another audio signal encodes another spoken utterance of the enrollment phrase, the device performs a particular action assigned to the enrollment phrase, and for each of the multiple variable length enrollment audio signals: processing, by the device, each of the plurality of enrollment feature vectors for the respective variable length enrollment audio signal using a long short term memory (LSTM) neural network to generate a respective enrollment LSTM output vector for each enrollment feature vector, and generating, by the device for the respective variable length enrollment audio signal, a template fixed length representation for use in determining whether the other audio signal encodes another spoken utterance of the enrollment phrase by combining at most a quantity k of the LSTM output vectors for the enrollment audio signal, wherein a predetermined length of each of the template fixed length representations is the same. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include, for each of the multiple variable length enrollment audio signals: determining whether at least the quantity k of enrollment feature vectors were generated for the respective enrollment audio signal, and in response to determining that less than the quantity k of enrollment feature vectors were generated for the respective enrollment audio signal, adding leading zeros to a front of the respective template fixed length representation so that the respective template fixed length representation has the predetermined length. The method may include determining an average number of enrollment frames in all of the enrollment audio signals wherein the quantity k is the average number of enrollment frames. Each of the enrollment output vectors may have a predetermined size 1 that corresponds to a size of a last layer in the long short term memory neural network. Adding leading zeros to the front of the respective template fixed length representation may include adding leading zeros to the front of the respective template fixed length representation so that the respective template fixed length representation has a total of 1 times k values. The last layer in the long short term memory neural network may include a hidden layer during training of the long short term memory neural network.

In some implementations, the method may include, for at least one of the multiple variable length enrollment audio signals: determining that more than the quantity k of enrollment feature vectors were generated for the respective enrollment audio signal, and in response, generating the template fixed length representation for the respective enrollment audio signal by combining the quantity k most recent enrollment LSMT output vectors. The method may include resetting, for each of the audio signals, values stored in cells of the long short term memory neural network prior to generating a first LSTM enrollment output vector for the respective audio signal. The method may include receiving, from another computer, the long short term memory neural network. Receiving the long short term memory neural network may include receiving a long short term memory neural network that does not include an output layer.

In some implementations, the method may include creating an average template fixed length representation by averaging values in each of the template fixed length representations to determine a corresponding value in the average template fixed length representation. The method may include receiving, for an audio signal encoding a spoken utterance of a phrase, a respective plurality of feature vectors each including values that represent features of the audio signal, processing each of the feature vectors using the long short term memory neural network to generate a respective LSTM output vector for each of the feature vectors, generating a fixed length representation for the audio signal by combining at most the quantity k of the LSTM output vectors, and determining whether the phrase and the enrollment phrase are the same and the phrase was spoken by the person using a comparison of the fixed length representation and the template fixed length representations. Determining whether the phrase and the enrollment phrase are the same using a comparison of the fixed length representation and all of the template fixed length representations may include determining whether the phrase and the enrollment phrase are the same using a comparison of the fixed length representation and an average template fixed length representation created by averaging the values in each of the template fixed length representations to determine a corresponding value in the average template fixed length representation. Determining whether the phrase and the enrollment phrase are the same using a comparison of the fixed length representation and all of the template fixed length representations may include determining a confidence score that represents a distance between the fixed length representation and the template fixed length representations.

Determining the confidence score that represents the distance between the fixed length representation and the template fixed length representations may include determining the distance between the fixed length representation and the template fixed length representations using a cosine distance function.

In some implementations, the method may include determining that the confidence score satisfies a threshold value. Determining whether the phrase and the enrollment phrase are the same using a comparison of the representation and all of the template fixed length representations may include determining that the phrase and the enrollment phrase are the same in response to determining that the confidence score satisfies the threshold value. The method may include receiving input indicating an action to perform in response to receipt of an audio signal encoding a spoken utterance of the enrollment phrase, and performing the action in response to determining that the phrase and the enrollment phrase are the same. Receiving input indicating the action to perform in response to receipt of an audio signal encoding a spoken utterance of the enrollment phrase may include receiving input indicating that when a particular device is asleep and receives an audio signal encoding a spoken utterance of the enrollment phrase, the particular device should wake up. Performing the action in response to determining that the phrase and the enrollment phrase are the same may include waking up by the particular device.

In some implementations, the method may include receiving, for an audio signal encoding a spoken utterance of a phrase, a respective plurality of feature vectors each including values that represent features of the audio signal, processing each of the feature vectors using the long short term memory neural network to generate a respective LSTM output vector for each of the feature vectors, generating a fixed length representation for the audio signal by combining at most the quantity k of the LSTM output vectors, and determining that the phrase and the enrollment phrase are not the same or were spoken by different people using a comparison of the representation and the template fixed length representations.

The subject matter described in this specification can be implemented in particular embodiments so as to realize one or more of the following advantages. In some implementations, a system that uses a long short term memory neural network to generate a template fixed length representation for use in determining whether the other audio signal encodes another spoken utterance of the enrollment phrase spoken may have a small memory footprint, e.g., to fit in a memory of a digital signal processor (DSP), low latency, and/or low computational cost. For instance, the system may perform vector comparison between the template fixed length representation and another vector that represents another audio signal to reduce computational cost. In some implementations, a system that uses a long short term memory neural network to generate a template fixed length representation for use in determining whether the other audio signal encodes another spoken utterance of an enrollment phrase allows a user to define their own hotword, e.g., without retraining an acoustic model. In some implementations, a system that uses a long short term memory neural network to generate a template fixed length representation for use in determining whether the other audio signal encodes another spoken utterance of the enrollment phrase only performs an action when the same user speaks the utterance during enrollment and runtime, e.g., the system is speaker adaptive. In some implementations, a system that uses a long short term memory neural network to generate a template fixed length representation for use in determining whether the other audio signal encodes another spoken utterance of the enrollment phrase may accurately determine whether or not a spoken utterance contains a hotword, was spoken by a particular user, or both, when an audio signal encoding the spoken utterance contains noise.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A device uses a long short term memory (LSTM) neural network to allow a user to specify whichever phrase they choose as a hotword key phrase. For instance, the device requests that the user speak the enrollment phrase a predetermined number of times, e.g., three, four, or five times, during an enrollment process and uses the LSTM neural network to generate enrollment vectors that represent the enrollment phrase. After enrollment, the device analyzes other phrases spoken by users to determine whether vectors that represent those phrases are within a predetermined distance of the enrollment vectors and those phrases are the same as the enrollment phrase and, optionally, spoken by the same user that performed the enrollment process. In some examples, the device may perform the analysis while in a sleep state and wake up upon determining that another phrase is the same as the enrollment phrase.

In some examples, a device may use the neural network to analyze received audio waveforms and determine if a sequence of frames from an audio waveform include a digital representation of one of the specific keywords or key phrases provided by the user during the enrollment process. Upon determination that a sequence of frames contains a digital representation of one of the specific keywords, or has probability above a threshold probability of containing a digital representation of one of the specific keywords, the device may perform an action that corresponds with the one of the specific keywords. For instance, the device may exit a standby state, launch an application, or perform another action.

Figure 1:
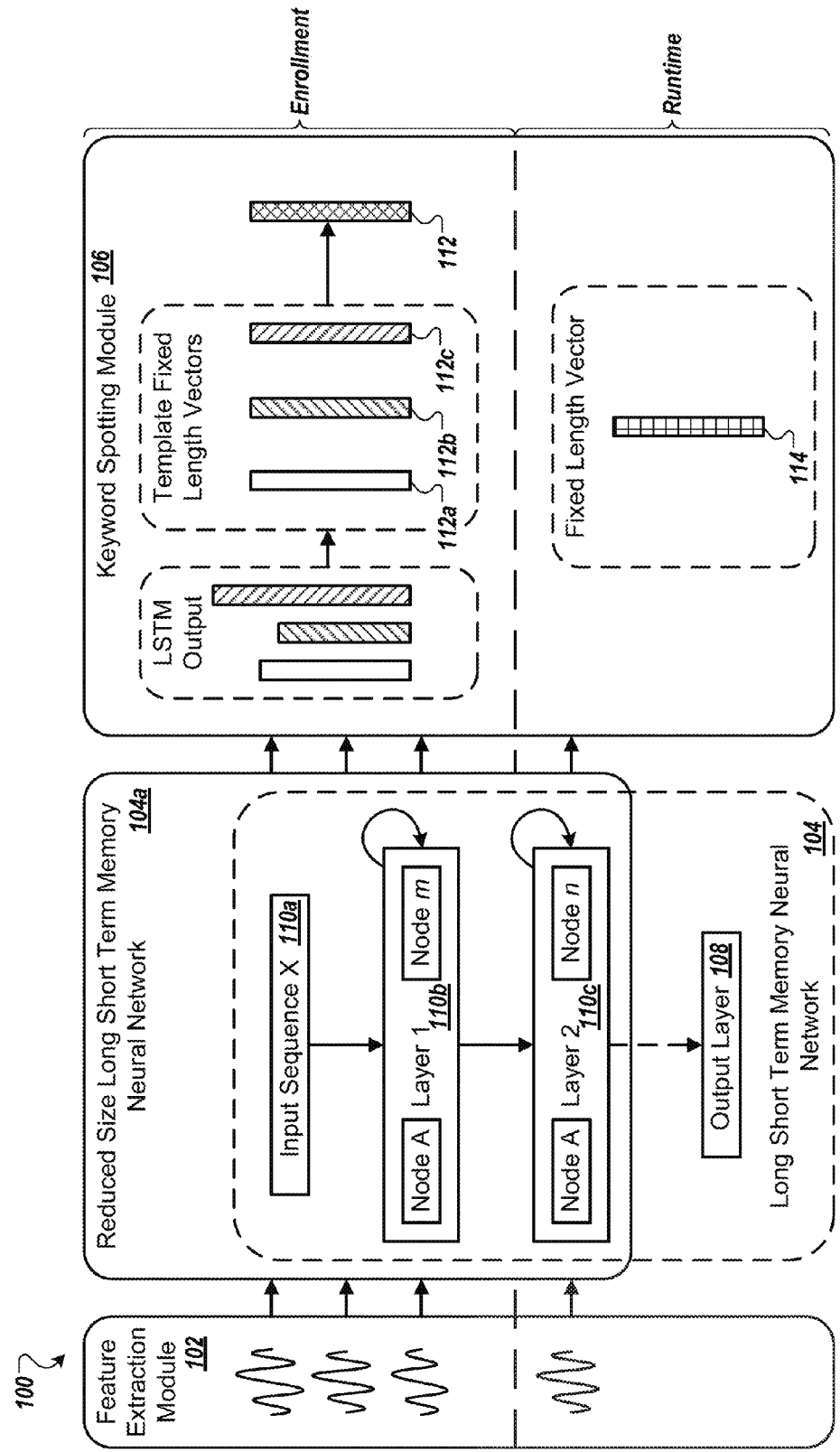
FIG. 1 is an example of a speech recognition system with a long short term memory neural network.

FIG. 1 is an example of a speech recognition system 100 with a LSTM neural network. The speech recognition system 100 is an example of a system implemented as computer programs on one or more computers in one or more locations, in which the systems, components, and techniques described below are implemented.

The speech recognition system 100 may include a feature extraction module 102, an LSTM neural network 104, and a keyword spotting module 106. The feature extraction module 102 performs voice-activity detection and generates a feature vector for every frame of audio data, e.g., from an audio waveform. For example, the speech recognition system 100 may receive an audio signal, e.g., as a continuous stream of data, that encodes an utterance and split the stream into multiple frames of data, e.g., with each frame being associated with 10 milliseconds of audio stream data. In some examples, the feature extraction module 102 divides an audio signal into on the order of one-hundred frames.

The feature extraction module 102 may analyze each of the frames to determine feature values for the frames and generate feature vectors from the feature values. Each feature vector may include multiple numeric values that represent features of the corresponding frame. In some examples, the feature extraction module 102 does not stack any of the frames because of the memory associated with the LSTM neural network 104 which will receive the frames, but the feature extraction module 102 may stack frames if the feature extraction module were providing the frames to a different type of neural network that did not include a memory.

The LSTM neural network 104 is a recurrent neural network that receives an input sequence of feature vectors, e.g., from the feature extraction module 102, and generates a sequence of outputs from the input sequence. For instance, the LSTM neural network 104 may receive an input sequence of feature vectors $x=\{x_1, \ldots, x_T\}$ from the feature extraction module 102. Each of the feature vectors corresponds to one of the frames from the audio signal. The LSTM neural network 104 computes a sequence of vectors $h=\{h_1, \ldots, h_T\}$, one for each of the intermediate layers in the LSTM neural network 104, and output vectors $y=\{y_1, \ldots, y_T\}$, using the intermediate vectors, for each of the frames $\{1, \ldots, T\}$.

In particular, the LSTM neural network 104 includes one or more LSTM layers, e.g., layers 110b and 110c, and an output layer 108. For each feature vector i in a given input sequence, the LSTM layers collectively process the feature vector to generate an LSTM output vector $h_i$ for the feature vector in accordance with current values of the parameters of the LSTM layers. The output layer 108 then processes the LSTM output vector $h_i$ generated by the LSTM layers for the feature vector in order to generate the output vector $y_i$ for the feature vector.

Each LSTM layer includes one or more LSTM memory blocks and each LSTM memory block includes one or more cells that each include an input gate, a forget gate, and an output gate that allow the cell to store previous activations generated by the cell as the current hidden state of the cell, e.g., for use in generating a current activation or to be provided to other components of the LSTM neural network 104. An example LSTM neural network is described in more detail in "Long Short-Term Recurrent Neural Network Architectures for Large Scale Acoustic Modeling," Hasim Sak, et al., CoRR, 2014.

The output layer 108 may use softmax activation functions to determine an estimate of the posterior probability of each output category in accordance with current values of the parameters of the output layer 108. The output layer 108 may have one cell per category, e.g., word, which the LSTM neural network 104 is trained to identify. The LSTM neural network 104 may receive the output categories during training and the output categories may be context dependent, e.g., specific to a particular device, software application, or user. For example, the output categories may be generated at training time via forced alignment using a standard Gaussian mixture model or neural network based large vocabulary continuous speech recognition system, e.g., a dictation system. In some examples, the LSTM neural network 104 has 15 k output targets in the output layer 108, each of which represents a whole word unit.

The LSTM neural network 104 can be trained in order to determine trained values for the parameters of the LSTM layers 110b and 110c and of the output layer 108. That is, the LSTM neural network 104 can, during a training process, be trained to predict posterior probabilities from the feature values included in feature vectors received by the LSTM neural network 104. In particular, during training, the LSTM neural network 104 can be provided feature vectors for which the posterior probabilities that should be predicted by the LSTM neural network 104 are known in order to adjust the values of the parameters of the LSTM neural network 104. The posterior probabilities correspond with entire words for the keywords or key phrases and represent the probability that the corresponding word is represented by a frame or multiple consecutive frames.

The training process for the LSTM neural network 104 continues until the LSTM neural network 104 achieves a desired accuracy. For instance, for each iteration of training, the values of the parameters of the LSTM neural network 104 are adjusted based on the accuracy of the posterior probabilities, or confidence scores, generated by the LSTM neural network 104 until the LSTM neural network 104 achieves the desired accuracy. In some implementations, the training is performed on a server and then the server provides the LSTM neural network 104 to a user device for the enrollment process. For instance, the server may provide a reduced size LSTM neural network 104a to the user device. The reduced size LSTM neural network 104a is a neural network that includes the LSTM layers 110b, 110c but that does not include the output layer 108. In some other implementations, the training is performed on the user device. In some examples, the server provides the entire LSTM neural network 104 to the user device.

After training, the user device performs an enrollment phase for keyword or key phrase detection. For instance, the user device receives three variable length audio signals each of which encode an utterance of the same phrase spoken by the same user and provides the audio signals to the feature extraction module 102. The phrase may include a single word or multiple words.

The feature extraction module 102 generates feature vectors for each of the audio signals and provides the feature vectors to the reduced size LSTM neural network 104a. For instance, the feature extraction module 102 provides the feature vectors for the first audio signal to the reduced size LSTM neural network 104a, then, separately, the feature vectors for the second audio signal, and finally the feature vectors for the third audio signal. The user device and the feature extraction module 102 may receive any number of audio signals during the enrollment process.

The keyword spotting module 106 receives the feature vectors from the reduced size LSTM neural network 104a and generates a respective template fixed length representation 112a-c, e.g., a vector, for each of the audio signals using the LSTM outputs generated by the reduced size LSTM neural network 104a, e.g., the outputs generated by the last LSTM layer 110c, e.g., which was previously the last hidden LSTM layer during training of the LSTM neural network 104. For instance, given input feature vectors $x=\{x_1, \ldots, x_T\}$ for T frames, the reduced size LSTM neural network 104a generates an LSTM output $h^{LH}=\{h_1^{LH}, \ldots, h_T^{LH}\}$ where each vector $h_i^{LH}$ and provides the LSTM output to the keyword spotting module 106. In some implementations, each vector $h_i^{LH}$ has n values, one value for each LSTM cell in the last hidden layer 110c.

Because each of the vectors $h_i^{LH}$ encodes information for the respective audio signal up to time i, e.g., the current vector, the keyword spotting module 106 does not need to use all T of the vectors $h_i^{LH}$ in the LSTM output but can select the most recent k vectors for the template fixed length representation of the respective audio signal and generate the template fixed length representation 112a-c as $f=\{h_{T-k+1}^{LH}, \ldots, h_T^{LH}\}$. The keyword spotting module 106 may select the parameter k based on the length of one or more of the audio signals, e.g., the number of frames included in one or more of the audio signals. For instance, k may be the average number of frames included in the three enrollment audio signals. Alternatively, k may be a predetermined integer value.

The keyword spotting module 106 generates each of the template fixed length representations 112a-c by concatenating, e.g., stacking, the vectors in $f=\{h_{T-k+1}^{LH}, \ldots, h_T^{LH}\}$ in sequential order. For instance, the keyword spotting module 106 places the values from the first of the k frames, e.g., T−k+1, at the beginning of the template fixed length representation, the values from the second of the k frames, e.g., T−k+2, next, and so on. In some examples, the keyword spotting module 106 places the values from the first of the k frames, e.g., T−k+1, at the end of the template fixed length representation, the values from the second of the k frames, e.g., T−k+2, before those values, and so on. The keyword spotting module 106 may place the values from the frames in the template representations in any order as long as the keyword spotting module 106 places the values in the same order for each template representation generated during enrollment and all fixed length representations generated during runtime.

When a particular one of the template fixed length representations 112a-c includes fewer than k values, e.g., T for the particular template fixed length representation is less than k, the keyword spotting module 106 may insert default values, e.g., zeros, into the beginning of the particular template fixed length representation until the particular template fixed length representation includes k values. For instance, when the parameter k is two and one of the template fixed length representations, e.g., the template fixed length representation 112b, includes values from only a single vector of length two such that $f_{initial}=\{0.03, 0.4\}$, the keyword spotting module 106 updates the template fixed length representation to be $f_{updated}=\{0, 0, 0.03, 0.4\}$ by adding zero values for another vector of the same length. In some implementations, the keyword spotting module 106 adds the default values to the end of a template fixed length representation until the template fixed length representation includes k values rather than adding the default values to the beginning of the representation.

In some implementations, the keyword spotting module 106 determines an average template representation 112 using all of the template fixed length representations 112a-c generated during the enrollment process. For instance, the keyword spotting module 106 may average all of the values in the first positions of the template fixed length representations 112a-c and use that first average in the first position of the average template representation 112, may average all of the values in the second positions of the template fixed length representations 112a-c and use that second average in the second position of the average template representation 112, and so on. In some examples, another module or modules, separate from the keyword spotting module 106, generates the template fixed length representations 112a-c, the average template representation 112, or both.

After all of the template fixed length representations have been generated, the keyword spotting module 106 may determine whether two of the template fixed length representations 112a-c are more than a threshold distance apart and prompt the user device to request another utterance of the keyword or key phrase from the user. For example, the keyword spotting module 106 may use any appropriate distance metric, e.g., vector distance metric, to compare the fixed length representation 114 and the template representations, e.g., Euclidean distance or Cosine distance to name a few examples, and determine the confidence score. The keyword spotting module 106 may then perform additional analysis, such as that described above, to generate another template fixed length representation for another audio signal that includes a representation of the other utterance spoken by the user.

Once the enrollment process is complete, the user device may use the speech recognition system 100 during runtime, e.g., using the reduced memory LSTM neural network 104a that does not include the output layer 108 LSTM neural network 104a. For instance, a microphone in the user device may generate an audio signal encoding an utterance spoken by the user and provide the audio signal to the feature extraction module 102. The feature extraction module 102 generates a sequence of feature vectors for the audio signal, each of which corresponds to a window of time in the audio signal.

The reduced size LSTM neural network 104a receives the sequence of feature vectors and generates and provides LSTM output to the keyword spotting module 106. The keyword spotting module 106 uses the LSTM output to generate a fixed length representation 114, e.g., a vector, from the output of the last hidden layer 110c. For instance, the keyword spotting module 106 receives the LSTM output and combines at most k of the vectors in the LSTM output to generate the fixed length representation 114, potentially adding leading zeros to the fixed length representation 114 if necessary.

The keyword spotting module 106 then performs a comparison, e.g., vector comparison, between the fixed length representation 114 and the template fixed length representations 112a-c or between the fixed length representation 114 and the average template representation 112 to determine a confidence score that represents the likelihood that the fixed length representation 114 represents the same phrase, potentially spoken by the same user, as the phrase used during the enrollment process. The keyword spotting module 106 may use any appropriate distance metric to compare the fixed length representation 114 and the template representations, e.g., Euclidean distance or Cosine distance to name a few examples, and determine the confidence score.

When the keyword spotting module 106 compares the fixed length representation 114 with each of the template fixed length representations 112a-c, the keyword spotting module 106 may determine that the phrase is the same as the enrollment phrase when the average of the confidence scores for the fixed length representation 114 and each of the template fixed length representations 112*a-c* satisfies a threshold value. In some examples, when the keyword spotting module 106 compares the fixed length representation 114 with each of the template fixed length representations 112*a-c*, the keyword spotting module 106 may determine that the phrase is the same as the enrollment phrase when each of the confidence scores for the fixed length representation 114 and each of the template fixed length representations 112*a-c* satisfies the threshold value.

When the confidence score satisfies a threshold confidence value, the speech recognition system provides the user device with a message indicating that there is a match. The user device may then perform an action associated with the phrase. For instance, the user device may receive input during the enrollment process identifying the action to perform upon receipt of the phrase, such as waking up, launching a particular application, or performing another predetermined action.

When the confidence score does not satisfy the threshold confidence value, the user device performs no action. For example, the user device does not prompt the user to re-state the phrase or provide other input.

During the enrollment and runtime phases, the memory in the reduced size LSTM neural network 104*a*, i.e., the internal states of the LSTM cells in the LSTM neural network 104*a*, is reset for each audio signal. For instance, while the reduced size LSTM neural network 104*a* processes the feature vectors for the first enrollment audio signal, the reduced size LSTM neural network 104*a* retains, updates, or both retains and updates, values that represent the previous feature vectors processed for the first enrollment audio signal, i.e., as the internal states of the LSTM cells in the network. Before the reduced size LSTM neural network 104*a* begins to process the second enrollment audio signal, the memory values in the reduced size LSTM neural network 104*a* are reset to zero or another default value. The reduced size LSTM neural network 104*a* then retains memory for the feature vectors processed for the second enrollment audio signal until the reduced size LSTM neural network 104*a* begins to process feature vectors for a different audio signal, e.g., during the enrollment or runtime phases.

In some implementations, before or after generation of a fixed size vector, the keyword spotting module 106 or another module may smooth the values received from the reduced size LSTM neural network 104*a*. For instance, the keyword spotting module 106 receives T vectors from the last hidden layer 110*c* in the reduced size LSTM neural network 104*a*, selects the k most recent of those vectors, smooths the values in each of those k vectors, and then generates the fixed length representation 114 using the smoothed vectors.

In some implementations, the feature extraction module 102 analyzes only the portions of an audio signal that are determined to include speech to reduce computation. For example, the feature extraction module 102 may include a voice-activity detector that may use thirteen-dimensional perceptual linear prediction (PLP) features and their deltas and double-deltas as input to a thirty-component diagonal covariance Gaussian Markov Model, to generate speech and non-speech posteriors for each frame. The feature extraction module 102 may perform temporal smoothing on the speech and non-speech posteriors to identify regions where the speech posteriors exceed a threshold and the corresponding frame is likely to include speech. For frames that include speech regions, the feature extraction module 102 may generate acoustic features based on forty-dimensional log-filterbank energies computed every ten milliseconds over a window of twenty-five milliseconds.

Figure 2:
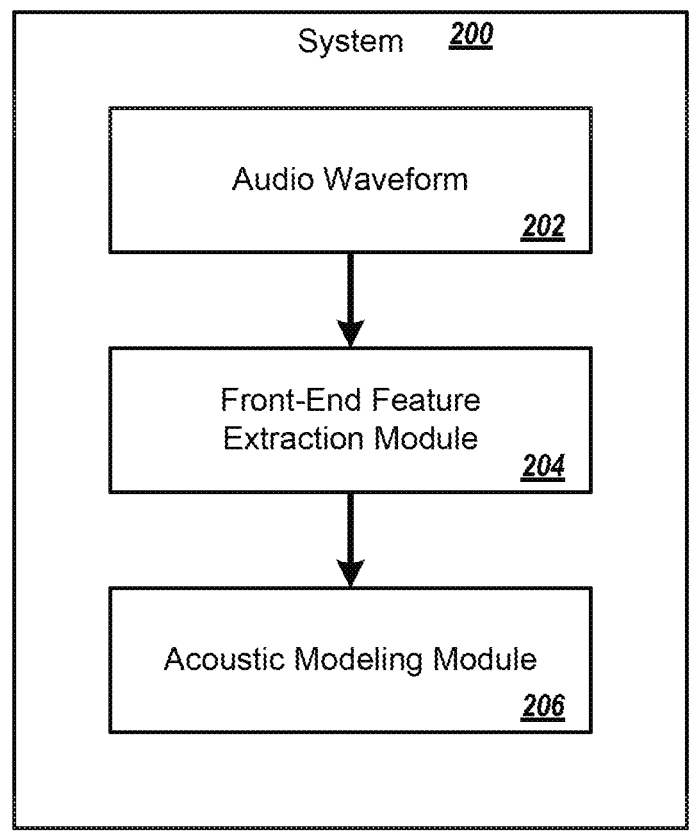
FIG. 2 is an example system for determining whether an audio waveform contains a digital representation of a specific keyword or key phrase.

FIG. 2 shows an example system 200 for determining whether an audio waveform contains a digital representation of a specific keyword or key phrase. The system 200, e.g., the speech recognition system 100, receives an audio waveform 202 and provides the audio waveform 202 to a front-end feature extraction module 204. For example, a microphone may capture an analog or digital representation of sound as the audio waveform 202 from a physical environment, e.g., that contains the microphone. The system 200 may include the microphone or another system may include the microphone and send the audio waveform 202 to the system 200.

The front-end feature extraction module 204 analyzes the audio waveform 202 to generate a series of feature vectors, described with reference to FIG. 3. Once the front-end feature extraction module 204 has finished the processing of the audio waveform 202, the front-end feature extraction module 204 sends the features vectors to an acoustic modeling module 206.

The acoustic modeling module 206 may use a variety of techniques, described with reference to FIG. 4, to analyze the feature vectors and produce, during training, posterior probability vectors that are representative of whether or not portions of the audio waveform 202 contain specific words or phrases for which the acoustic modeling module is programmed. The acoustic modeling module 206 may use the posterior probability vectors to determine a posterior probability, and potentially a confidence score, that indicates whether a keyword or a key phrase is present in the corresponding audio waveform, as describe with reference to FIG. 5.

During an enrollment process or runtime, the acoustic modeling module 206 generates fixed length vectors that are representative of the words or phrases encoded in the audio waveform 202. The acoustic modeling module 206 then provides the fixed length vectors to a keyword spotting module 106, described with reference to FIG. 1.

Figure 3:
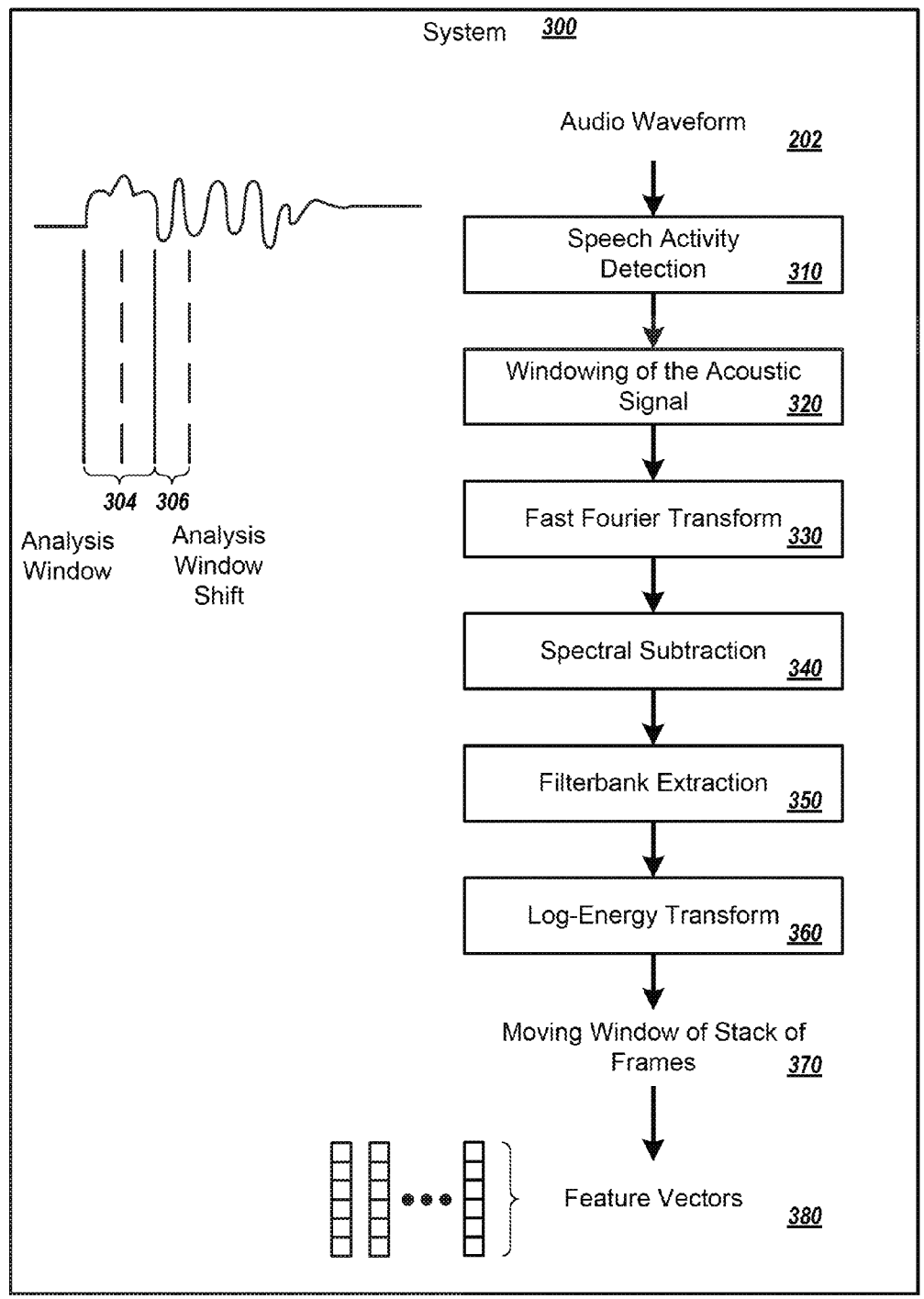
FIG. 3 is a block diagram of an example system for a feature extraction process.

FIG. 3 is a block diagram of an example system 300 for a feature extraction process. For example, the front-end feature extraction module 204 may receive the audio waveform 202. The front-end feature extraction module 204 may analyze the audio waveform 202 by dividing the audio waveform 202 into a plurality of windows and analyzing each of the windows, e.g., separately. For example, the front-end feature extraction module 204 may identify an analysis window 304 with a specific size, e.g., a 25 ms time period, for the audio waveform 202. The front-end feature extraction module 204 may obtain multiple analysis windows in succession by performing an analysis window shift 306, for example a 10 ms time period shift.

One or more analysis windows may overlap. For example, one analysis window may represent audio waveform 202 from a start time of 0 ms to an end time of 25 ms and a subsequent analysis window may represent audio waveform 202 from a start time of 10 ms to an end time of 35 ms.

The analysis windows 304 are obtained as part of speech activity detection 310, in which the system 300 obtains information about available sound in its environment, e.g., the physical environment surrounding a microphone that captured the audio waveform 202. Speech activity detection 310 may occur regardless of whether there is sound in the surrounding environment, or speech activity detection 310 may occur only when the system 300 detects a volume of sound greater than a threshold volume, e.g., in the audio waveform 202.

Once speech activity detection 310 occurs, the front-end feature extraction module 204 creates a plurality of acoustic windows from the acoustic signal 320. In some implementations, each window may have a short time interval, such as 25 ms, that represents characteristics of audio waveform 202 over that time interval.

After windowing, the front-end feature extraction module 204 may perform a Fast Fourier transform 330 on the windowed data to analyze the constituent frequencies present in the audio waveform.

In some implementations, the front-end feature extraction module 204 may perform spectral substitution 340 to minimize the noise in the windowed data, e.g., the transformed windowed data. The spectral substitution may minimize any potential negative effects of noise in the audio waveform 202 during later processing.

The front-end feature extraction module 204 may perform filter bank extraction 350 to separate individual components of the audio data from one another. Each of the individual components generated during filter bank extraction 350 may carry a single frequency sub-band of the audio waveform 202 or the windowed data.

In some implementations, the front-end feature extraction module 204 performs a log-energy transform 360 on the received data to normalize the data, e.g., the windowed data. The normalization of the data may enhance relevant features in the data that are used in subsequent processing.

The front-end feature extraction module 204 generates a moving window of a stack of frames 370. The stack of frames 370 may include eleven or twenty-six frames, each including data represent 25 ms of the audio waveform 202, with a shift of 10 ms between consecutive frames. The stack of frames 370 may include as few as two frames or any larger number of frames, such as fifty frames. The size of the stack of frames 370 may depend on the length of the keyword, key phrase, or acoustic unit predicted by the system 200.

The front-end feature extraction module 204 generates a plurality of feature vectors 380 that represent acoustic features of a frame from the audio waveform 202 by performing the aforementioned analytical techniques to obtain information about characteristics of the audio waveform 202 for successive time intervals. In some examples, the numerical values in each of the feature vectors 380 represent properties of the corresponding frames. For instance, each of the feature vectors 380 may have forty values. Each of the values may be generated using a filter bank included in the front-end feature extraction module 204 and the system 300.

Figure 4:
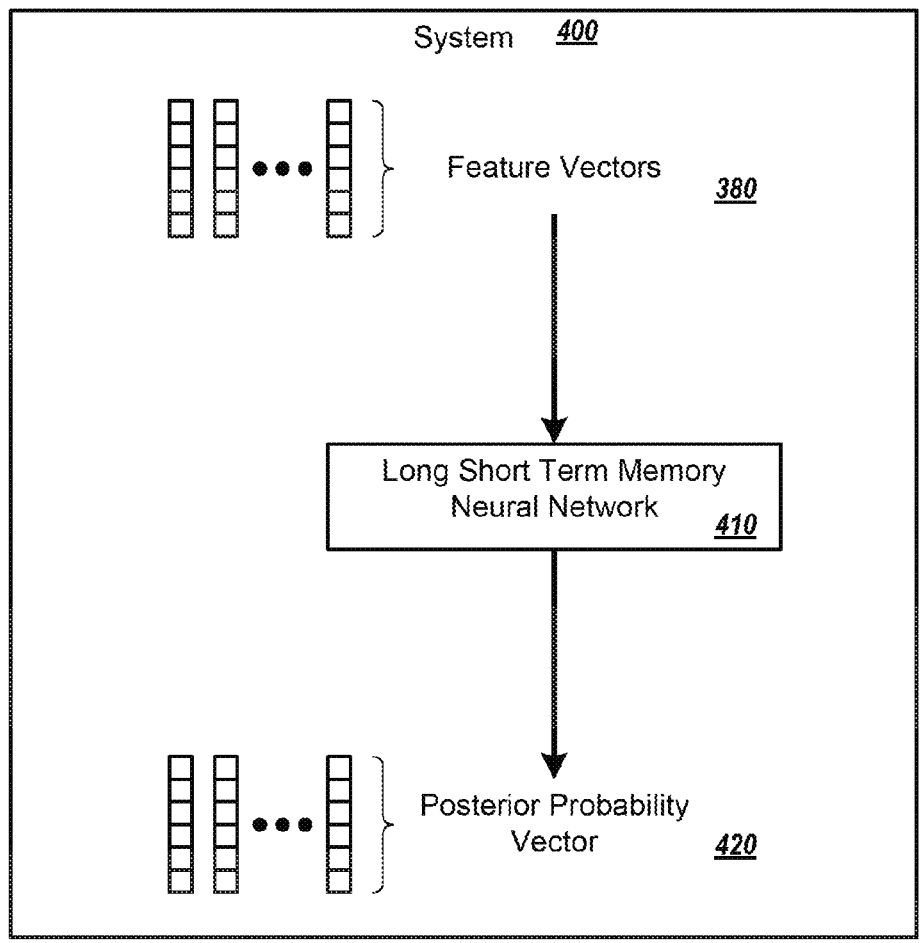
FIG. 4 is a block diagram of an example system for determining a posterior probability vector.

FIG. 4 is a block diagram of an example system 400, e.g., a neural network system, for determining a posterior probability vector, e.g., during training, and generating vectors representative of audio signals. For instance, the acoustic modeling module 206, shown in FIG. 1, receives the plurality of feature vectors 380 from the front-end feature extraction module 204, one for each of the frames 370, and generates a corresponding posterior probability vector 420 for each of the feature vectors 380. For a particular feature vector, the corresponding posterior probability vector 420 includes a value for each of the words for which the speech recognition system is trained. The value indicates the probability that the frame represented by the feature vector includes at least a portion of an audio signal of the corresponding word.

The acoustic modeling module 206 includes a neural network 410, e.g., the LSTM neural network 104 described with reference to FIG. 1, that generates the corresponding set of posterior probability vectors 420, where each of the posterior probability vectors 420 corresponds with one of the feature vectors 380. The acoustic modeling module 206 is trained to determine whether a stack of feature vectors matches a word.

The acoustic modeling module 206 processes each of the feature vectors 380 using the neural network 410 to determine if properties of the feature vector match the properties of the expected event vectors for the words, e.g., such as "Okay" and "Google," and generates a posterior probability for each of the expected event vectors where the posterior probability is representative of the similarity of the properties. For instance, a higher score may represent a greater similarity between a feature vector and an expected event vector compared to a lower score. In some examples, a lower score may represent a greater similarity between a feature vector and an expected event vector compared to a higher score.

When the acoustic modeling module 206 processes a first feature vector and the acoustic modeling module 206 is programmed to identify two known words, "Okay" and "Google," a first posterior probability vector corresponding to the first feature vector includes at least two posterior probability scores, one for each of the known words. Each of the posterior probability scores represents the degree of acoustic match between the first feature vector and the expected event vectors.

For example, when the first feature vector is associated with the spoken word "Okay," the scores for "Okay" and "Google" may be 1.0 and 0.0 respectively. In some examples, when the first feature vector is associated with the spoken word "Search," the scores for "Okay" and "Google" are both 0.0. In some examples, when the first feature vector is associated with the spoken word "Google," the scores for "Okay" and "Google" are 0.0 and 0.95 respectively, e.g., when there may be a potentially small difference between the first feature vector and the expected event vector for "Google".

In some implementations, a sum of the posterior probability scores in a posterior probability vector 420 is 1.0. For example, the sum of the posterior probability scores for the spoken word "Okay" would be 1.0 (the "Okay" known word score)+0.0 (the "Google" known word score)=1.0 and the sum of the scores for the spoken word "Google" may be 0.05 (the "Okay" known word score)+0.95 (the "Google" known word score)=1.0.

The posterior probability scores may represent the confidence of the acoustic modeling module 206 that the acoustic properties of a feature vector match an expected event vector. In some examples, when the acoustic modeling module 206 identifies a match between a feature vector and an expected event vector, the corresponding posterior probability score might not be 1.0 based on a variance between the feature vector and the expected event vector, such as with the example for the spoken word "Google" above.

In some implementations, the acoustic modeling module 206 may determine a confidence score from a posterior probability score or multiple posterior probability scores.

Figure 5:
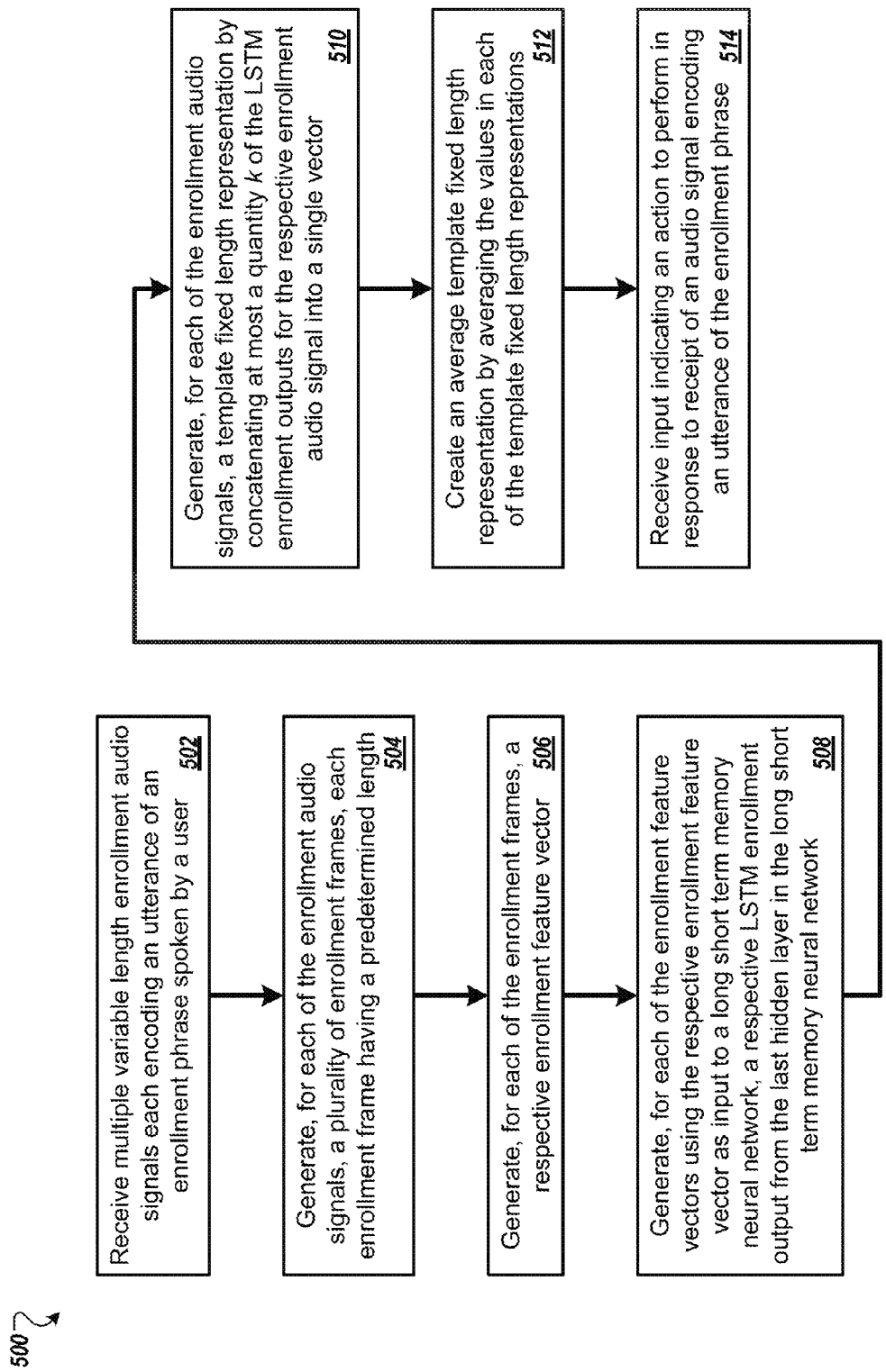
FIG. 5 is a flowchart of an example process for a keyword spotting enrollment process.

FIG. 5 is a flowchart of an example process 500 for keyword spotting enrollment. For convenience, the process 500 will be described as being performed by a system of one or more computers located in one or more locations. For example, an augmented neural network system, e.g., the speech recognition system 100 of FIG. 1, appropriately programmed in accordance with this specification, can perform the process 500.

At 502, the system receives multiple variable length enrollment audio signals each encoding an utterance of an enrollment phrase spoken by a user. The enrollment phrases included in each of the utterances are the same and the same user speaks each of the utterances.

At 504, the system generates, for each of the enrollment audio signals, a plurality of enrollment frames, each of which has a predetermined length. For instance, the feature extraction module divides each of the enrollment audio signals into multiple frames and each frame is for the same duration of time, e.g., 25 ms. The feature extraction module may generate a frame for every 10 ms of the audio signal, e.g., such that the frames overlap.

At 506, the system generates, for each of the enrollment frames, a respective enrollment feature vector. Each of the feature vectors may be 40-dimensional, e.g., may represent 40-dimensional log-filterbank energies of the corresponding frame window. For example, the feature extraction module may generate $T_i$ enrollment feature vectors for each of the enrollment audio signals, for values of i from one to T.

At 508, the system receives the enrollment feature vectors and generates, for each of the enrollment feature vectors using the respective enrollment feature vector as input, a respective LSTM enrollment output for the feature vector by processing the feature vector using the reduced size LSTM. For instance, the reduced size LSTM receives T enrollment feature vectors for a particular enrollment audio signal and generates T LSTM enrollment outputs, e.g., vectors, from the last layer, e.g., previously hidden, in the reduced size LSTM without resetting the memory of the reduced size LSTM. When the reduced size LSTM is ready to receive input for another of the enrollment audio signals, the memory of the reduced size LSTM is reset, e.g., to zero or another default value, so that the memory is specific to only the audio signal currently being processed.

At 510, the system generates, for each of the enrollment audio signals, a template fixed length representation by concatenating at most a quantity k of the LSTM enrollment outputs for the respective enrollment audio signal into a single vector. If the keyword spotting module determines that the number T of enrollment output vectors for a particular audio signal is less than k, the keyword spotting module adds zero values to the respective template fixed length representation so that the template fixed length representation has the appropriate size. In some examples, when each of the enrollment output vectors has a length of l, the keyword spotting module adds zeros to the template fixed length representation, e.g., the end or the beginning of the template fixed length representation, until the length of the template fixed length representation is l times k.

At 512, the system creates an average template fixed length representation by averaging the values in each of the template fixed length representations. For instance, the keyword spotting module takes each of the template fixed length representations, after ensuring that each of these vectors has the same length, e.g., l times k, and averages the values in the corresponding spots of the template fixed length representations to determine a value for the corresponding spot in the average template fixed length representation.

At 514, the system, e.g., user device, receives input indicating an action to perform in response to receipt of an audio signal encoding an utterance of the enrollment phrase. For example, the enrollment process may be to determine a key phrase for which the user device will wake from a sleep or standby state or a key phrase associated with a different action, e.g., launching of a particular application, generating a predetermined text or email message, playing a particular song, etc.

The order of steps in the process 500 described above is illustrative only, and keyword spotting enrollment can be performed in different orders. For example, the system may receive the input indicating the action to perform prior to receiving the enrollment audio signals.

In some implementations, the process 500 can include additional steps, fewer steps, or some of the steps can be divided into multiple steps. For example, the process may receive the enrollment feature vectors, generate the enrollment output vectors, and generate the template fixed length representations, e.g., perform steps 508 and 510, without performing the other steps. In some examples, step 512, 514, or both may be optional.

Figure 6:
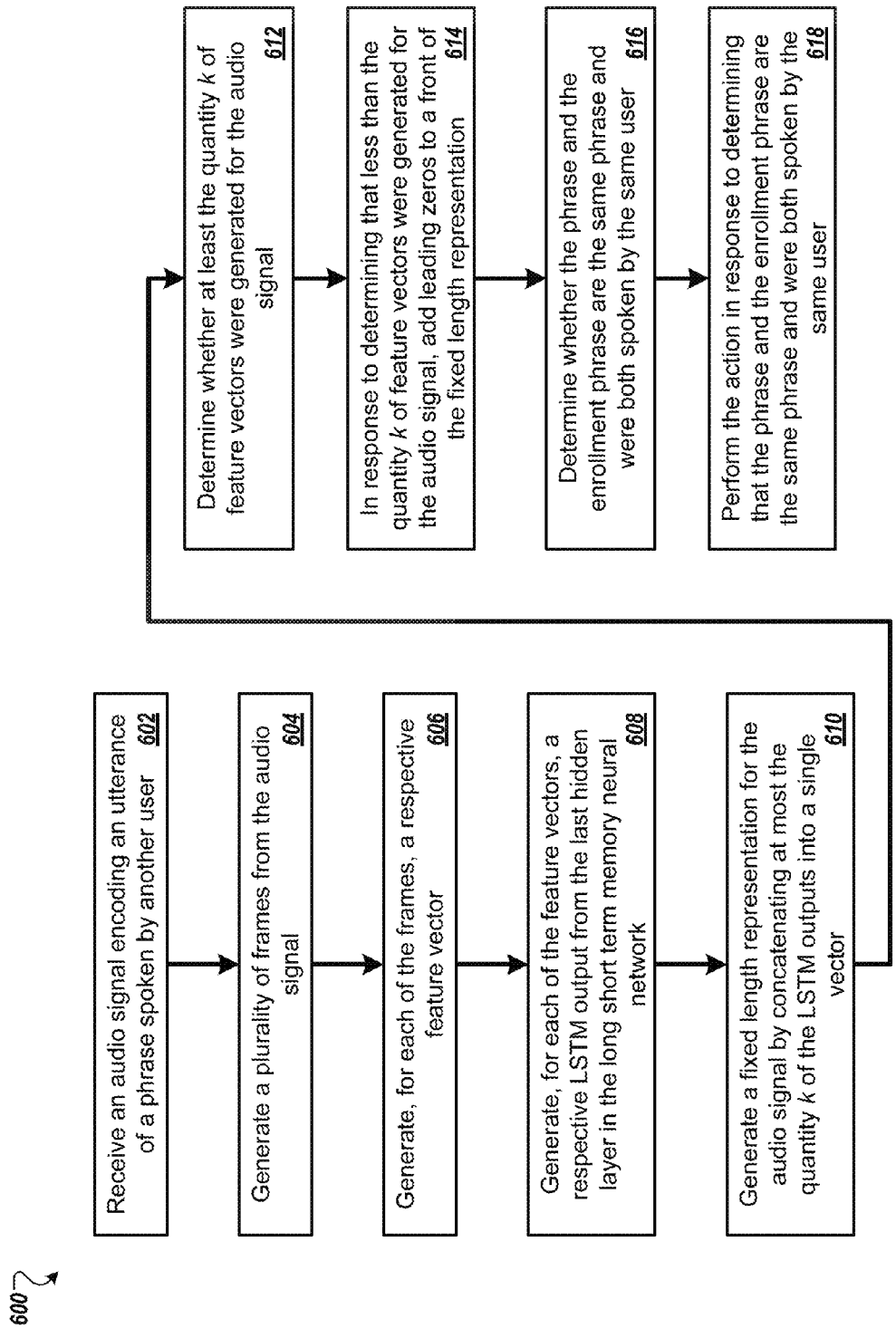
FIG. 6 is a flowchart determining whether a phrase spoken during runtime is the same as an enrollment phrase.

FIG. 6 is a flowchart of an example process 600 for determining whether a phrase spoken during runtime is the same as an enrollment phrase. For convenience, the process 600 will be described as being performed by a system of one or more computers located in one or more locations. For example, an augmented neural network system, e.g., the speech recognition system 100 of FIG. 1, appropriately programmed in accordance with this specification, can perform the process 600.

At 602, the system receives an audio signal encoding an utterance of a phrase spoken by another user. For instance, the feature extraction module receives the audio signal from a microphone, e.g., included in the same user device as the feature extraction module or another device.

At 604, the system generates a plurality of frames from the audio signal and, at 606, the feature extraction module generates, for each of the frames, a respective feature vector. The system may perform steps 604 and 606 as part of the process 500 separately from the process 600, e.g., for each of the enrollment audio signals.

At 608, the system generates, for each of the feature vectors, a respective LSTM output, e.g., vector, for the feature vector using the reduced size LSTM. For instance, the user device received the reduced size LSTM from the server without the output layer of the LSTM and processes the feature vector using the reduced size LSTM to generate an output vector, i.e., the LSTM output from what was previously the last hidden layer during training of the LSTM, for the feature vector. The reduced size LSTM places the values from the LSTM output in the vector in a sequential order. The value from the first cell is placed in the first location of the vector, the value from the second cell is placed in the second location in the vector, and so on. Alternatively, the value from the first cell may be placed in the last location of the vector. The reduced size LSTM may use any appropriate method to place the values from the LSTM output in the output vector as long as the values from the cells are placed in consistent locations in the output vector, i.e., during enrollment and runtime.

At 610, the system generates a fixed length representation for the audio signal by concatenating at most the quantity k of the LSTM outputs into a single vector. For instance, the keyword spotting module places values from the first of the k output vectors in the last positions of the fixed length representation, and so on, in a manner that is the same as the generation of the template fixed length representations.

At 612, the system determines whether at least the quantity k of feature vectors were generated for the audio signal. At 614, in response to determining that less than the quantity k of feature vectors were generated for the audio signal, the keyword spotting module adds leading zeros to a front of the fixed length representation. Alternatively, the keyword spotting module may add trailing zeros to an end of the fixed length representation.

At 616 the system determines whether the phrase and the enrollment phrase are the same phrase and were both spoken by the same user. For instance, the keyword spotting module uses vector comparison to determine a distance between the two vectors that represents a similarity between the two vectors. If the distance satisfies a threshold distance, the keyword spotting module determines that the phrase and the enrollment phrase are the same and both were spoken by the same user. If the distance does not satisfy the threshold distance, the keyword spotting module determines that either the phrase and the enrollment phrase are not the same, or that the other user is not the same as the user who performed the enrollment process.

At 618, the system performs the action in response to determining that the phrase and the enrollment phrase are the same phrase and were spoken by the same user. In some implementations, the system performs the action upon determining that the phrase and the enrollment phrase are the same irrespective of whether or not they were spoken by the same user.

In some implementations, the process 600 can include additional steps, fewer steps, or some of the steps can be divided into multiple steps. For example, the process 600 may be performed by a single system along with the process 500, e.g., the system performs the process 500 and then the process 600. In some examples, a single module may perform steps 610 and 612, either the reduced size LSTM, the keyword spotting module, or another module in the system.

Figure 7:
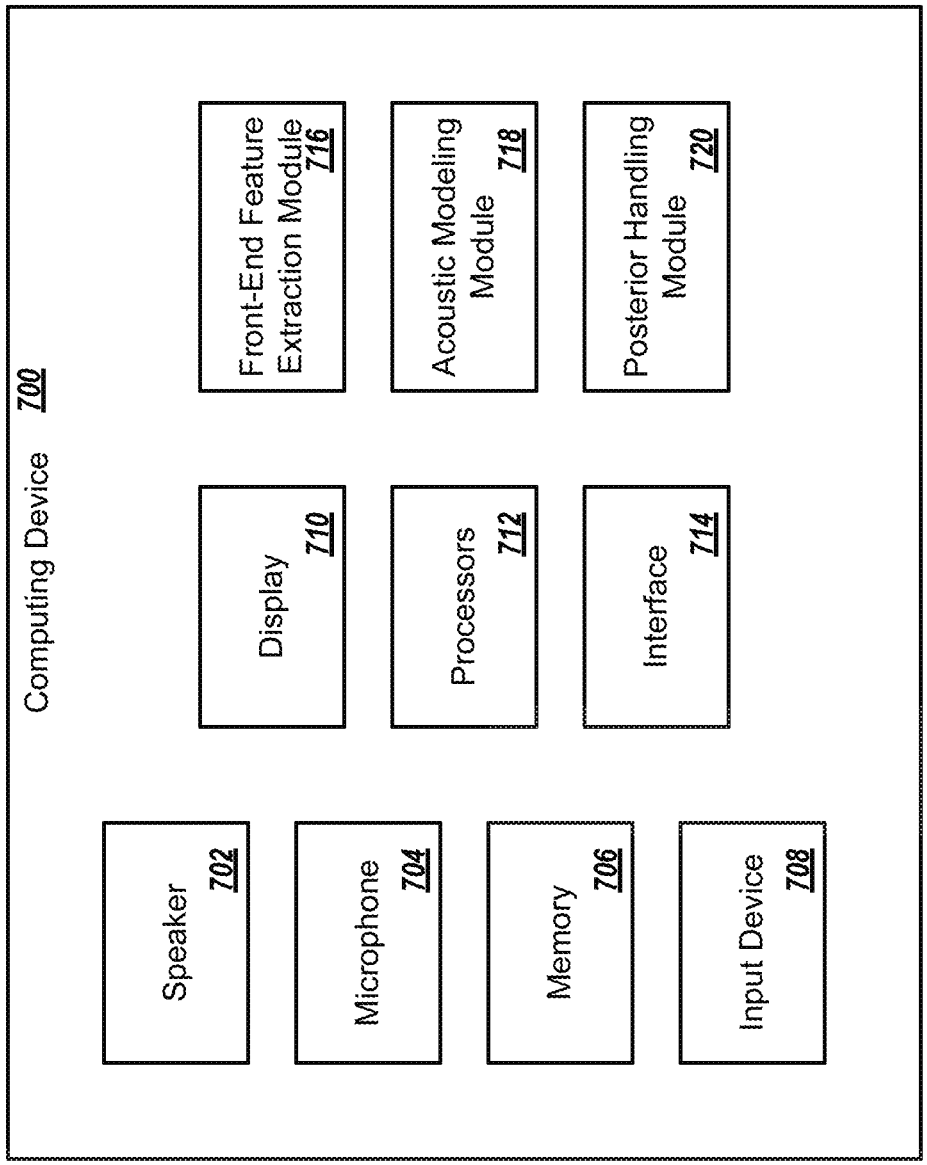
FIG. 7 is a block diagram of an example computing device that can detect keyword and key phrase utterances in an audio waveform.

FIG. 7 is a block diagram of an example computing device 700 that can detect keyword and key phrase utterances in an audio waveform. The computing device 700 contains a variety of constituent parts and modules that may be implemented through appropriate combinations of hardware, firmware, and software that allow the computing device 700 to function as an embodiment of appropriate features.

The computing device 700 contains one or more processors 712 that may include various hardware devices designed to process data. The processors 712 are communicatively coupled to other parts of computing device 700. For example, the processors 712 may be coupled to a speaker 702 and a microphone 704 that allow output and input of audio signals to and from an area that physically surrounds the computing device 700. The microphone 704 may provide the raw signals that capture aspects of the audio waveform 202 that are processed in other portions of the computing device 700.

The computing device 700 may include a memory 706. The memory 706 may include a variety of memory storage devices, such as persistent storage devices that allow permanent retention and storage of information manipulated by the processors 712.

An input device 708 allows the receipt of commands by the computing device 700 from a user, and an interface 714 allows computing device 700 to interact with other devices to allow the exchange of data. The processors 712 may be communicatively coupled to a display 710 that provides a graphical representation of information processed by the computing device 700 for the presentation to a user.

The processors 712 may be communicatively coupled to a series of modules that perform the functionalities necessary to implement the method of embodiments that is presented in FIG. 5. These modules include a front-end feature extraction module 716, which performs as described with reference to FIG. 3, an acoustic modeling module 718, which performs as described with reference to FIG. 4, and a posterior handling module 720, which performs as described with reference to FIG. 5.

The acoustic modeling module 718 may use a neural network, e.g., described with reference to FIG. 1 above. For instance, the neural network is specific to a particular set of keywords and key phrases and, for each input feature vector, outputs a posterior probability score vector with values for each of the keywords and key phrases.

As discussed above, the task of keyword detection is an important component in some speech recognition applications. For example, when the vocabulary size is limited, or when the task requires activating a device, for example, a phone, by saying a word, keyword detection is applied to classify whether an utterance contains a word or not and whether the word is a particular word or part of a phrase for which the device has been programmed to identify.

For example, the task performed by some embodiments includes detecting a single word, for example, "Google," that will activate a device from a standby mode to perform a task. The device continuously monitors received audio waveforms for the predetermined keywords and/or key phrases. The computing device 700 may perform the enrollment process for multiple different users, each associated with a different user account, to allow each of the users to define their own keyword or key phrase, which may or may not be the same as another user's keyword or key phrase. The computing device 700 may determine which user spoke the key phrase and perform a predetermined action for that user, e.g., and for that user's account. For instance, the computing device 700 may wake from a sleep state and provide the user with a home screen for that user's account.

In some implementations, the acoustic modeling module 718, e.g., the LSTM neural network 104, is trained to identify phones or syllables instead of words. In these implementations, the template fixed length representations and the fixed length representations indicate a particular set of phones or syllables included in the key phrase and the order in which those phones or syllables are spoken.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 8:
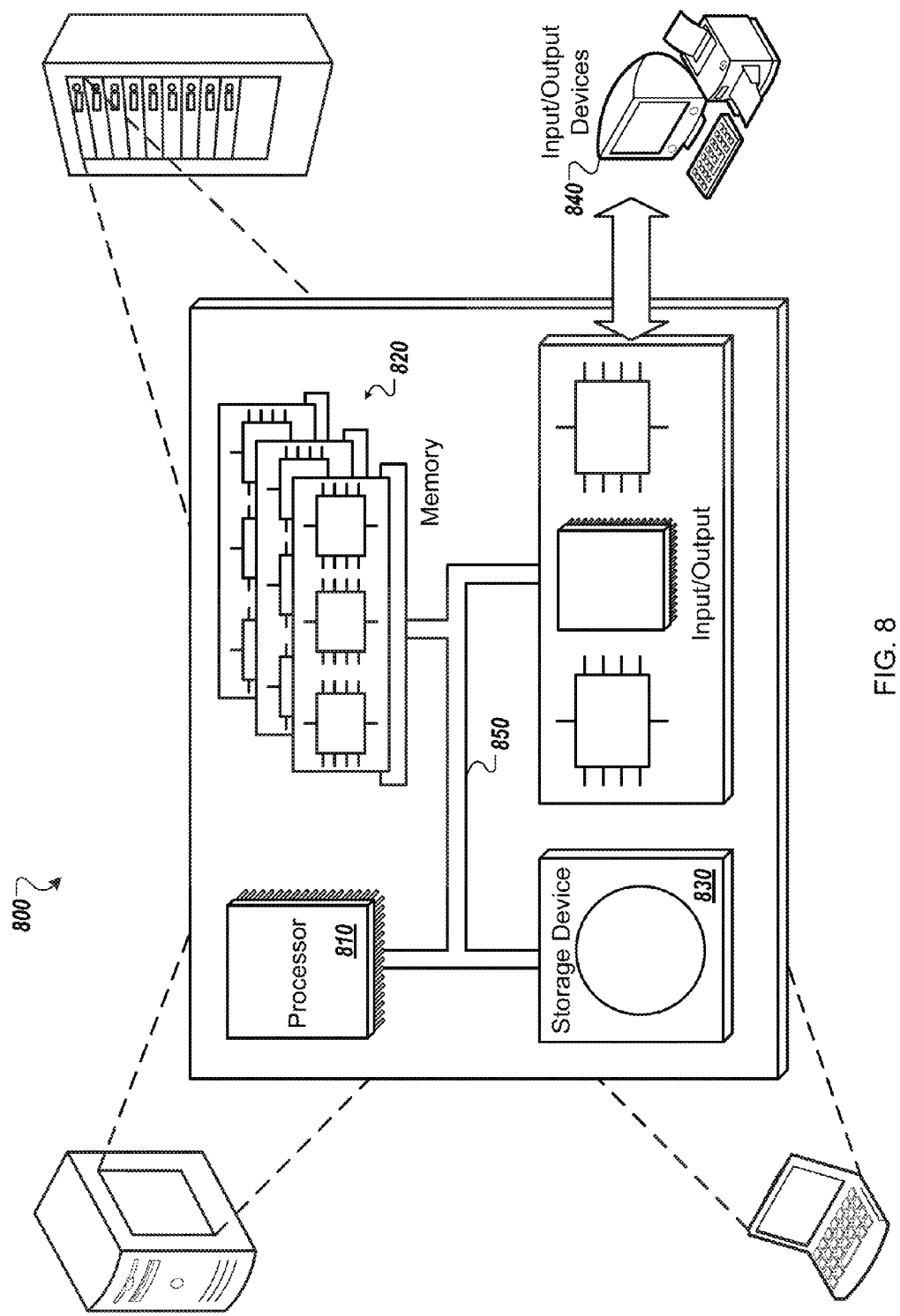
FIG. 8 is a block diagram of a computing system that can be used in connection with computer-implemented methods described in this document.

An example of one such type of computer is shown in FIG. 8, which shows a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising a computer and one or more storage devices storing instructions that are operable, when executed by a computer, to cause the computer to perform operations comprising:
   providing, for a particular audio signal encoding an utterance of a spoken phrase, a plurality of feature vectors that each comprise values that represent features of the particular audio signal as input to a neural network;
   receiving, from the neural network and for each of the feature vectors, a respective output vector generated using the respective feature vector;
   generating a fixed length representation for the particular audio signal by combining at most a quantity k of the output vectors;
   determining whether the spoken phrase and an enrollment phrase are the same using a comparison of the fixed length representation and a template fixed length representation, wherein the computer uses the template fixed length representation to determine whether an audio signal encodes another spoken utterance of the enrollment phrase; and
   performing an action associated with the enrollment phrase in response to determining that the spoken phrase and the enrollment phrase are the same using the comparison of the fixed length representation and the template fixed length representation.

2. A method comprising:
   providing, by a user device for a particular audio signal encoding an utterance of a spoken phrase, a plurality of feature vectors that each comprise values that represent features of the particular audio signal as input to a neural network;
   receiving, from the neural network and for each of the feature vectors, a respective output vector generated using the respective feature vector;
   generating a fixed length representation for the particular audio signal by combining at most a quantity k of the output vectors;
   determining whether the spoken phrase and an enrollment phrase are the same using a comparison of the fixed length representation and a template fixed length representation, wherein the user device uses the template fixed length representation to determine whether an audio signal encodes another spoken utterance of the enrollment phrase; and
   performing, by the user device, an action associated with the enrollment phrase in response to determining that the spoken phrase and the enrollment phrase are the same using the comparison of the fixed length representation and the template fixed length representation.

3. The method of claim 2, wherein performing the action associated with the enrollment phrase comprises waking up the user device.

4. The method of claim 2, wherein determining whether the spoken phrase and the enrollment phrase are the same using the comparison of the fixed length representation and the template fixed length representation comprises determining whether the spoken phrase and the enrollment phrase are the same using the comparison of the fixed length representation and multiple template fixed length representations including the template fixed length representation, wherein the user device uses each of the multiple template fixed length representations to determine whether an audio signal encodes another spoken utterance of the enrollment phrase.

5. The method of claim 4, wherein determining whether the spoken phrase and the enrollment phrase are the same using the comparison of the fixed length representation and the multiple template fixed length representations comprises determining whether the spoken phrase and the enrollment phrase are the same using a comparison of the fixed length representation and an average template fixed length representation created by averaging the values in each of the template fixed length representations to determine a corresponding value in the average template fixed length representation.

6. The method of claim 2, wherein determining whether the spoken phrase and the enrollment phrase are the same using the comparison of the fixed length representation and the template fixed length representation comprises determining a confidence score that represents a distance between the fixed length representation and the template fixed length representation.

7. The method of claim 6, wherein determining the confidence score that represents the distance between the fixed length representation and the template fixed length representation comprises determining the distance between the fixed length representation and the template fixed length representation using a cosine distance function.

8. The method of claim 6, comprising determining that the confidence score satisfies a threshold value, wherein determining whether the spoken phrase and the enrollment phrase are the same using the comparison of the fixed length representation and the template fixed length representation comprises determining that the spoken phrase and the enrollment phrase are the same in response to determining that the confidence score satisfies the threshold value.

9. The method of claim 2, comprising:
determining whether at least the quantity k of feature vectors were generated for the particular audio signal; and
in response to determining that less than the quantity k of feature vectors were generated for the particular audio signal, adding leading zeros to a front of the fixed length representation so that the fixed length representation has a predetermined length that is the same as a length of the template fixed length representation.

10. The method of claim 2, comprising:
determining that more than the quantity k of output vectors were generated for the particular audio signal, wherein generating the fixed length representation for the particular audio signal comprises combining the quantity k most recent output vectors in response to determining that more than the quantity k of output vectors were generated for the particular audio signal.

11. The method of claim 2, wherein determining whether the spoken phrase and the enrollment phrase are the same using the comparison of the fixed length representation and the template fixed length representation comprises determining whether the spoken phrase and the enrollment phrase are the same using the comparison of the fixed length representation that has a predetermined length and the template fixed length representation that has the predetermined length.

12. A non-transitory computer-readable medium storing software comprising instructions executable by a computer which, upon such execution, cause the computer to perform operations comprising:
providing, for a particular audio signal encoding an utterance of a spoken phrase, a plurality of feature vectors that each comprise values that represent features of the particular audio signal as input to a neural network;
receiving, from the neural network and for each of the feature vectors, a respective output vector generated using the respective feature vector;
generating a fixed length representation for the particular audio signal by combining at most a quantity k of the output vectors;
determining whether the spoken phrase and an enrollment phrase are the same using a comparison of the fixed length representation and a template fixed length representation, wherein the computer uses the template fixed length representation to determine whether an audio signal encodes another spoken utterance of the enrollment phrase; and
performing an action associated with the enrollment phrase in response to determining that the spoken phrase and the enrollment phrase are the same using the comparison of the fixed length representation and the template fixed length representation.

13. The computer-readable medium of claim 12, wherein performing the action associated with the enrollment phrase comprises waking up the computer.

14. The computer-readable medium of claim 12, wherein determining whether the spoken phrase and the enrollment phrase are the same using the comparison of the fixed length representation and the template fixed length representation comprises determining whether the spoken phrase and the enrollment phrase are the same using the comparison of the fixed length representation and multiple template fixed length representations including the template fixed length representation, wherein the computer uses each of the multiple template fixed length representations to determine whether an audio signal encodes another spoken utterance of the enrollment phrase.

15. The computer-readable medium of claim 14, wherein determining whether the spoken phrase and the enrollment phrase are the same using the comparison of the fixed length representation and the multiple template fixed length representations comprises determining whether the spoken phrase and the enrollment phrase are the same using a comparison of the fixed length representation and an average template fixed length representation created by averaging the values in each of the template fixed length representations to determine a corresponding value in the average template fixed length representation.

16. The computer-readable medium of claim 12, wherein determining whether the spoken phrase and the enrollment phrase are the same using the comparison of the fixed length representation and the template fixed length representation comprises determining a confidence score that represents a distance between the fixed length representation and the template fixed length representation.

17. The computer-readable medium of claim 16, wherein determining the confidence score that represents the distance between the fixed length representation and the template fixed length representation comprises determining the distance between the fixed length representation and the template fixed length representation using a cosine distance function.

18. The computer-readable medium of claim 16, comprising determining that the confidence score satisfies a threshold value, wherein determining whether the spoken phrase and the enrollment phrase are the same using the comparison of the fixed length representation and the template fixed length representation comprises determining that the spoken phrase and the enrollment phrase are the same in response to determining that the confidence score satisfies the threshold value.

19. The computer-readable medium of claim 12, comprising:
determining whether at least the quantity k of feature vectors were generated for the particular audio signal; and
in response to determining that less than the quantity k of feature vectors were generated for the particular audio signal, adding leading zeros to a front of the fixed length representation so that the fixed length representation has a predetermined length that is the same as a length of the template fixed length representation.

20. The computer-readable medium of claim 12, comprising:
determining that more than the quantity k of output vectors were generated for the particular audio signal, wherein generating the fixed length representation for the particular audio signal comprises combining the quantity k most recent output vectors in response to determining that more than the quantity k of output vectors were generated for the particular audio signal.

21. The computer-readable medium of claim 12, wherein determining whether the spoken phrase and the enrollment phrase are the same using the comparison of the fixed length representation and the template fixed length representation comprises determining whether the spoken phrase and the enrollment phrase are the same using the comparison of the fixed length representation that has a predetermined length and the template fixed length representation that has the predetermined length.

* * * * *